(12) United States Patent
Price et al.

(10) Patent No.: US 6,789,352 B2
(45) Date of Patent: Sep. 14, 2004

(54) PEST BAIT STATION

(75) Inventors: Richard Vasco Price, Pukalani, HI (US); Arthur W. Simpson, Honolulu, HI (US)

(73) Assignee: Integrated Pest Management Technologies, Inc., Honolulu, HI (US)

( * ) Notice: Subject to any disclaimer, the term of this patent is extended or adjusted under 35 U.S.C. 154(b) by 0 days.

(21) Appl. No.: 10/294,185

(22) Filed: Nov. 13, 2002

(65) Prior Publication Data

US 2004/0088905 A1 May 13, 2004

(51) Int. Cl.[7] .................................................. A01M 1/20
(52) U.S. Cl. ........................................ 43/131; 43/132.1
(58) Field of Search ........................... 43/131, 114, 121, 43/124, 132.1

(56) References Cited

U.S. PATENT DOCUMENTS

| | | | | |
|---|---|---|---|---|
| 552,644 A | * | 1/1896 | Matthews | 43/114 |
| 885,615 A | * | 4/1908 | Handler et al. | 43/114 |
| 919,507 A | * | 4/1909 | Wiegand et al. | 43/114 |
| 935,428 A | * | 9/1909 | Stranzenbach | 43/114 |
| 954,887 A | * | 4/1910 | Ross | 43/114 |
| 1,071,578 A | * | 8/1913 | Rese | 43/114 |
| 1,185,935 A | * | 6/1916 | Pugh | 43/122 |
| 1,715,958 A | * | 6/1929 | Strand | 43/122 |
| 1,922,702 A | * | 8/1933 | Krsitman | 43/131 |
| 1,960,464 A | * | 5/1934 | Thalheimer | 43/131 |
| 2,837,861 A | * | 6/1958 | Graham, Sr. | 43/131 |
| 3,630,446 A | * | 12/1971 | Roth et al. | 43/131 |
| 3,771,254 A | * | 11/1973 | Scott et al. | 43/131 |
| 3,931,692 A | * | 1/1976 | Hermanson | 43/131 |
| 4,244,135 A | * | 1/1981 | Harwoods | 43/122 |
| 4,551,941 A | * | 11/1985 | Schneidmiller | 43/107 |
| 4,793,093 A | * | 12/1988 | Gentile | 43/131 |
| 4,796,381 A | * | 1/1989 | Kauth et al. | 43/124 |
| 4,841,669 A | * | 6/1989 | Demarest et al. | 43/131 |
| 4,866,877 A | * | 9/1989 | Barak | 43/121 |
| 4,876,274 A | * | 10/1989 | Palmer et al. | 514/452 |
| 4,908,977 A | * | 3/1990 | Foster | 43/107 |
| D367,311 S | * | 2/1996 | Donahue et al. | D22/122 |
| 5,557,880 A | * | 9/1996 | Schneidmiller | 43/122 |
| 5,665,370 A | * | 9/1997 | Gehret et al. | 424/413 |
| 5,728,394 A | * | 3/1998 | Liquido et al. | 424/405 |
| 5,943,817 A | * | 8/1999 | Miller | 43/131 |
| 6,014,834 A | * | 1/2000 | Ferland | 43/131 |
| 6,192,621 B1 | * | 2/2001 | Fain | 43/131 |
| 6,219,960 B1 | * | 4/2001 | Contadini et al. | 43/121 |
| 6,272,791 B1 | * | 8/2001 | Pleasants | 43/131 |
| 6,378,242 B1 | * | 4/2002 | Roberts | 43/109 |
| 6,430,868 B1 | * | 8/2002 | Plato et al. | 43/121 |
| 6,505,434 B1 | * | 1/2003 | Kloczko et al. | 43/114 |
| 6,508,031 B1 | * | 1/2003 | Johnson et al. | 43/88 |

FOREIGN PATENT DOCUMENTS

GB        1294 492     * 10/1972

* cited by examiner

*Primary Examiner*—Kurt Rowan
*Assistant Examiner*—Joan M. Olszewski
(74) *Attorney, Agent, or Firm*—Myers Dawes Andras & Sherman LLP; Vic Lin

(57) ABSTRACT

A pest bait station includes a disposable carrier disposed in a reusable housing. Pest bait is securely affixed to the carrier such that movement of the station does not dislodge the bait from the carrier. A first bait affixed to a lower surface of the carrier exterminates smaller pests while a second bait affixed to an upper surface of the carrier exterminates larger pests. The carrier is shaped, such as a cone, to provide a lower space and an upper space for receiving differently sized pests. A lid of the housing is shaped to accommodate the shape of the cone. The lid is removably coupled to a base to form a water-tight seal. Openings formed in the base allow for entry of pests. A magnet or adhesive may be placed on a bottom side of the base to enable the station to be coupled to any surface.

20 Claims, 3 Drawing Sheets

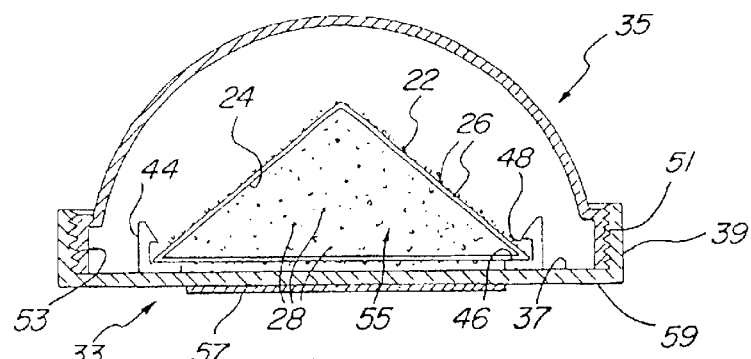
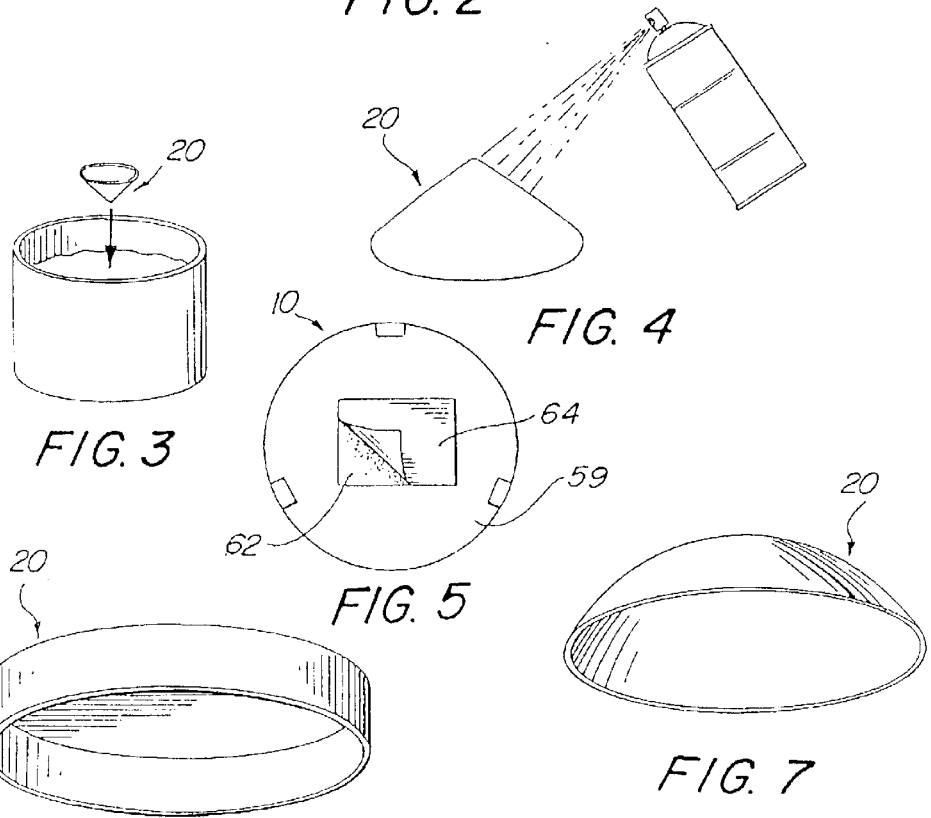

PEST BAIT STATION

BACKGROUND OF THE INVENTION

1. Field of the Invention

The invention relates generally to pest control and, more particularly, to pest bait devices.

2. Description of Prior Art and Related Information

Pest control devices, such as those for roaches, typically include an enclosure into which pests enter to ingest a pesticide disposed therein. Typical pesticides come in the form of granules or chunks which are loosely housed in the enclosure. Since conventional pest control devices are intended to remain stationary once deployed, such devices are not designed for any movement. Pest control devices, however, are commonly deployed within a residence where they are susceptible to being moved by incidental contact, for example, by residents who may accidentally kick one while walking.

Any movement of such a device can easily cause the pesticide within to exit the enclosure and come into contact with the user. Even if the pesticide does not come into direct contact with the user as an immediate result of movement of the device, the exit of the pesticide creates a hazard as the pesticide then becomes accessible to direct human contact by, for example, laying on a floor upon which people walk barefoot. Furthermore, conventional pest control devices come in relatively small packages which can be entirely placed in the mouths of unknowing children and pets.

Aside from incidental movement of common pest control devices, a typical pest control device typically requires removal of packaging and deployment in a desired location. However, the very act of deployment itself can cause the pesticide within the enclosure to exit and come into contact with the user. Therefore, a great need exists for pest control devices which prevent the exit of any pesticide material.

SUMMARY OF THE INVENTION

In accordance with the present invention, structures and associated methods are disclosed which address these needs.

In one aspect, a pest control apparatus is provided. The apparatus comprises a housing defining an aperture and including a base and a lid removably coupled to the base. The lid is configured to form a water-tight seal with the base. The base includes a floor. A bait carrier is disposed within the housing and spaced apart from the floor. A pest bait is sufficiently affixed to the bait carrier. The apparatus further comprises supports extending from the base and adapted to space the carrier apart from the floor. The bait carrier may comprise a cone shape having an upper surface and a lower surface. The pest bait comprises a first pest bait adhered to the upper surface of the bait carrier and a second pest bait adhered to a lower surface of the bait carrier. The lid may comprise a dome shape.

The pest bait may be absorbed into or adsorbed onto the bait carrier. The pest bait may also be secured to the bait carrier by electrical attraction or magnetic attraction. The pest bait may comprise granules, a powder or pebbles. A magnet or an adhesive may be coupled to a bottom side of the base. The housing may be re-usable while the carrier is preferably disposable. The apparatus may further comprise a plurality of additional disposable carriers.

In another aspect, a re-usable pest control apparatus is provided. The apparatus comprises a reusable housing including a first housing portion and a second housing portion removably coupled to the first housing portion. A plurality of disposable bait carriers are adapted to be placed in the re-usable housing. At least one pest bait material is securely affixed to each disposable bait carrier.

A method for manufacturing a pest control apparatus is also provided. The method comprises providing a bait carrier, securely affixing pest bait to the bait carrier, providing a housing with at least one aperture, and disposing the bait carrier in the housing. Affixing pest bait onto the bait carrier comprises adhering the pest bait onto the bait carrier. If the pest bait comprises a liquid, the step of affixing pest bait onto the bait carrier may comprise the step of absorbing the pest bait into the bait carrier. Affixing pest bait onto the bait carrier may also comprise adsorbing the pest bait onto the bait carrier, electrically attracting the pest bait to the bait carrier, or magnetically attracting the pest bait to the bait carrier. Providing a housing comprises providing a base, and providing a removable lid that forms a water-tight seal with the base.

In a further aspect, a method is provided for terminating pests. The method comprises securely affixing a pest bait onto a carrier, sheltering the carrier from downpour with a housing, supporting the carrier a distance above a floor of the housing, and terminating the pests with the pest bait. Where the carrier comprises a first carrier, the method further comprising discarding the first carrier, and replacing the discarded first carrier with a second carrier.

In summary, a pest bait station includes a carrier disposed in a housing. Pest bait is securely affixed to the carrier such that movement of the station does not dislodge the bait from the carrier. Poisonous pest bait material may be included in a sticky, starch solution which is then absorbed into or adsorbed onto the carrier. A first bait affixed to a lower surface of the carrier exterminates smaller pests while a second bait affixed to an upper surface of the carrier exterminates larger pests. The carrier is shaped, such as a cone, to provide a lower space and an upper space for receiving differently sized pests. A lid of the housing is shaped to accommodate the shape of the cone. The lid is removably coupled to a base to form a water-tight seal. Openings formed in the base allow for entry of pests.

The invention, now having been briefly summarized, may be better visualized by turning to the following drawings wherein like elements are referenced by like numerals.

BRIEF DESCRIPTION OF THE DRAWINGS

FIG. 2 is a cross-sectional view of the first preferred embodiment of the pest bait station;

FIG. 3 is a perspective view of a preferred method of securely affixing pest bait onto a bait carrier;

FIG. 4 is a perspective view of a second preferred method of securely affixing pest bait onto a bait carrier;

FIG. 5 is a bottom plan view of an alternative embodiment of the pest bait station;

FIG. 6 is a bottom perspective view of an alternative preferred embodiment of a pest bait carrier;

FIG. 7 is a bottom perspective view of an alternative preferred embodiment of a pest bait carrier.

The invention and its various embodiments can now be better understood by turning to the following detailed description wherein illustrated embodiments are described.

It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

Figure 1:
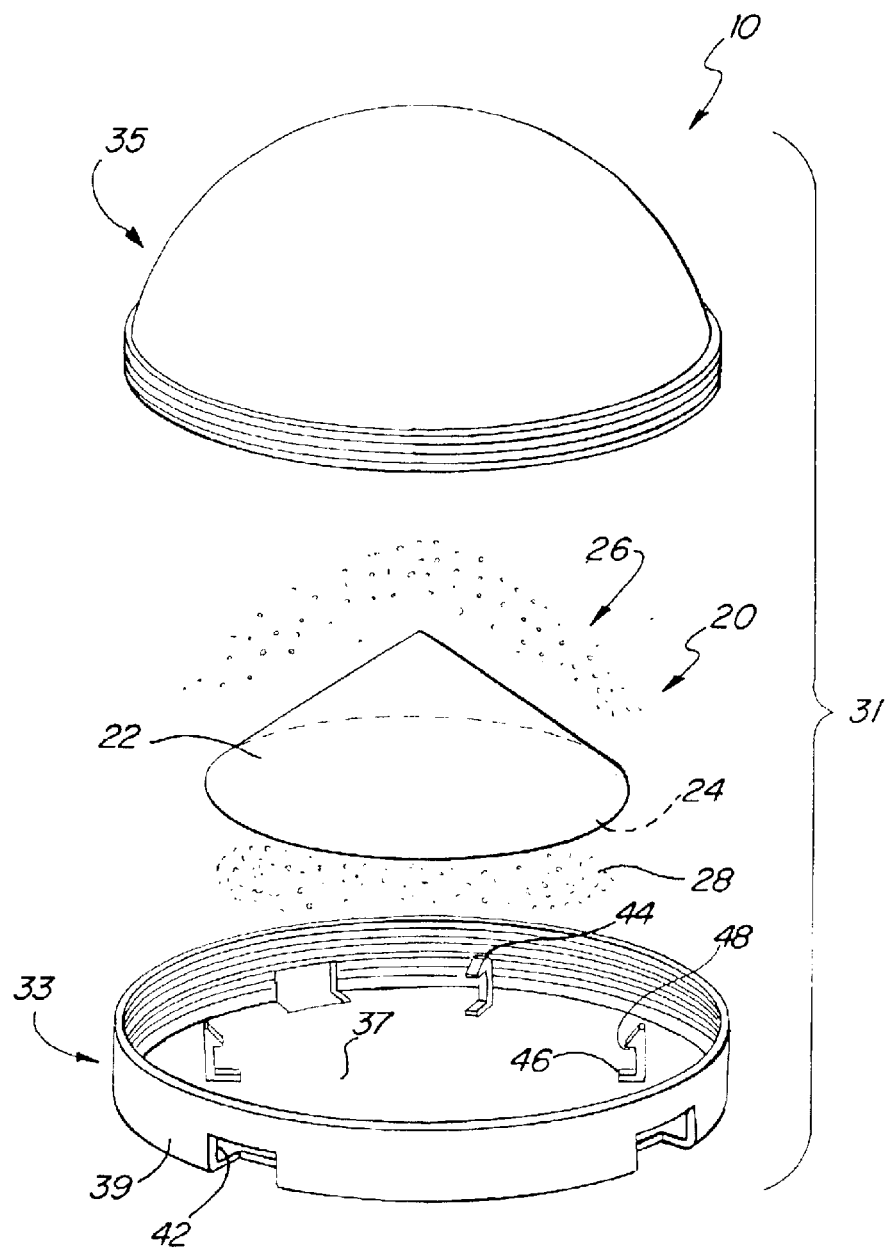
FIG. 1 is an exploded view of a preferred embodiment of a pest bait station according to the invention.

FIG. 1 is an exploded view of a preferred embodiment of a pest bait apparatus, or station, 10. The station 10 comprises a pest bait carrier 20 which, in the illustrated embodiment, preferably comprises a cone shape. It is to be expressly understood that the carrier 20 may comprise any particular shape. In the preferred embodiment, the carrier 20 includes a first, upper surface 22 and a second, lower surface 24. A first pest bait material 26 is securely affixed to the upper surface 22 while a second pest bait material 28 is securely affixed to the lower surface 24. Throughout this specification, "securely affixed" refers to the pest bait material(s) being carried by the pest bait carrier in a sufficiently secure manner such that movement of the carrier would not cause the pest bait to become detached from the carrier. Pest bait or pest bait materials refer to compositions which attract and terminate pests. Examples include toxic pesticides as well as mixtures of pest adhesives and pheromones, also known as "sticky traps", which terminate pests simply by way of adhesion.

It should be expressly understood that the pest bait may be provided in a variety of mediums. By way of examples and not by limitations, the pest bait materials 26, 28 may be provided as an adhesive solution, such as a starch solution, a paste or gel, which is then applied to the surfaces 22, 24 of the carrier 20. Where the pest bait material comprises a granular, powder or chunk form, an adhesive may initially be applied to the either surface 22, 24 of the carrier 20. The pest bait material(s) may then be adsorbed onto the adhesive surfaces 22, 24 of the carrier 20. In FIG. 3, the carrier 20 may be composed of an absorbent material, such as paper, which is then dipped into a liquid solution of pest bait material. The liquid solution may include starch to facilitate absorption or adsorption of the pest bait material. In FIG. 4, the pest bait material may comprise a liquid form that is sprayed onto the surfaces of the carrier 20.

Further examples include magnetically polarizing the carrier 20 and the pest bait material(s) to provide a magnetic bond. Along the same lines, the carrier 20 and the pest bait material may be provided with electrical charges to provide an electrical bond. For example, the carrier 20 may be ionized with a first charge while the pest bait material ionized with a second, opposite charge.

Referring to FIGS. 1 and 2, the carrier 20 with the securely affixed pest bait materials 26, 28 is disposed within a housing 31. In the preferred embodiment, the housing 31 comprises a base 33 and a removable lid 35. The base 33 comprises a floor 37 and a circumferential side wall 39. A plurality of apertures, or entrances, 42 are defined in the base 33, primarily through the side wall 39 and adjacent portions of the floor 37, to enable pests to enter the station 10.

Supports 44 disposed on the floor 37 are adapted to hold the carrier 20 above the floor 37. In the preferred embodiment, the supports 44 are placed to receive a periphery of the carrier 20. As shown in FIG. 2, the carrier 20 rests upon ledges 46 of the supports 44. Each support 44 includes a shoulder, or tab, 48 overhanging the periphery of the carrier so as to hold the carrier 20 in place and prevent it from being dislodged when the entire station 10 is moved. It is to be expressly understood that a variety of different mechanisms may be employed as supports. The support may comprise any mechanism that is adapted to both hold a carrier above the floor 37 of the base 33 and prevent the carrier from being tossed around within the housing 31 when the station 10 is moved.

In the preferred embodiment, the lid 35 is configured to be removably coupled to the base 33. The lid 35 is preferably configured to form a water-tight seal with the base 33 to shield the interior of the housing 31 from downpour. As an example and not by way of limitation, the lid 35 comprises an externally threaded portion 51 that mates with an internally threaded portion 53 included in the side wall 39 of the base 33. A variety of other mechanisms may also be employed to accomplish a water-tight, yet removable coupling between the lid 35 and the base 33.

In the preferred embodiment, a magnet 57 is disposed on a bottom side 59 of the base 33. In an alternative embodiment 10 shown in FIG. 5, the magnet may be replaced with adhesive 62 on the bottom side 59. A peel away sticker 64 covers the adhesive 62. Thus, the station 10 may be disposed vertically, such as being coupled to a wall or door, or oriented upside-down, such as being adhered to the under surface of a kitchen cabinet. With the use of a magnet, an adhesive, fasteners or any other support mechanisms, the station 10 may be disposed in any particular orientation. It will be appreciated that with the pest bait materials secured affixed to the carrier 20, the pest bait material will not be dislodged even when the station 10 is placed vertically or upside-down. Where the station 10 is simply placed right-side-up on a horizontal surface such as a floor, for example, the adhesive 62 serves to fix the station 10 in place and prevent movement.

In the illustrated embodiment, the carrier 20 is shaped as a cone and the lid 35 is shaped as a dome to accommodate the cone-shaped carrier 20. It is to be expressly understood that the carrier 20 may be provided in any particular shape, and that the lid 35 may also be provided in any corresponding shape to accommodate the carrier 20. In the preferred embodiments, the lid 35 is configured to provide substantial space above the upper surface 22 of the carrier 20 to enable larger pests, such as roaches, to crawl thereupon.

It will be appreciated that the cone-shaped carrier 20 provides a lower interior room, or space, 55 defined by the lower surface 24. This space 55 is preferably configured for receiving smaller pests, such as ants, beetles, moths, silverfish and other common crawling insects found in homes and gardens. Thus, the second pest bait material 28 which is securely affixed to the lower surface 24 may be composed of a bait directed at exterminating such smaller pests that are capable of reaching the interior space 55. Examples of such pest bait material include, without limitation, hydramethylnon, sodium tetraborate decahydrate and sticky traps. At the same time, the first bait material securely affixed to the upper surface 22 may comprise a bait directed at exterminating larger pests, such as roaches, scorpions, millipedes, centipedes, and other insects which are inclined to access the upper surface 22 of the carrier 20. The first bait material may comprise sticky traps, for example, which are effective for such larger crawling insects found in homes and gardens.

In FIGS. 6 and 7, it will be appreciated that the carrier 20 may be provided in a variety of shapes and sizes so as to provide both an interior space adapted for attracting smaller pests, and an upper surface adapted for attracting larger pests. As examples and not by way of limitations, the carrier 20 may be shaped as a cup as shown in FIG. 6, a dome as shown in FIG. 7, or as any other structure which preferably defines a lower space adapted for smaller pests and provides an upper surface adapted for larger pests.

Figure 8:
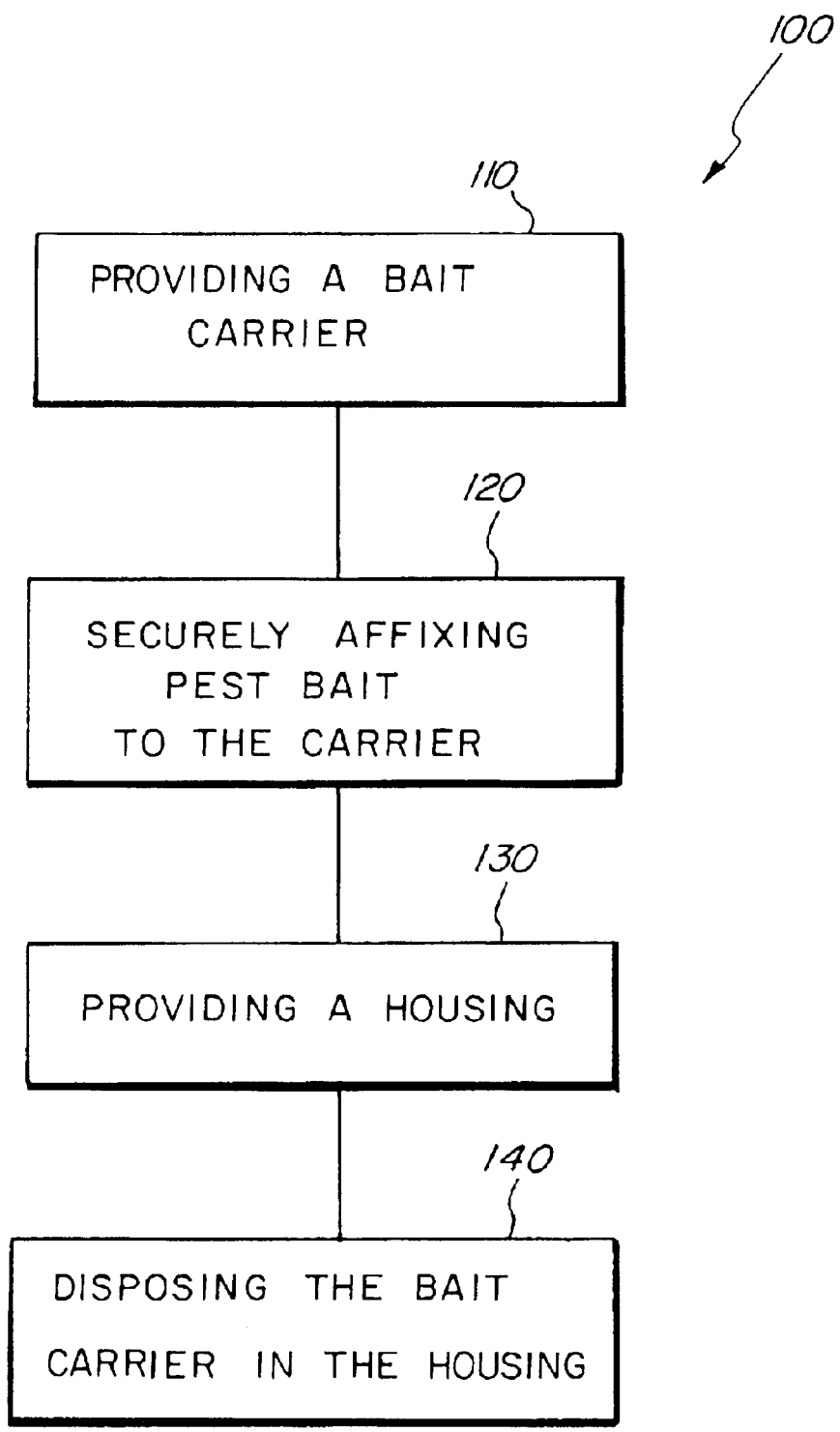
FIG. 8 is a diagram of a preferred method for manufacturing a pest control device.

Methods of manufacturing a pest bait station are also provided according to the invention. In FIG. 8, a preferred method of manufacturing a pest bait station is shown and designated generally by reference numeral 100. In step 110, a bait carrier is provided. As described above, the bait carrier may comprise a variety of shapes. The bait carrier is preferably composed of a material to which pest bait materials can be easily and securely affixed.

Accordingly, in step 120, pest bait is securely affixed to the bait carrier such that the pest bait would not be dislodged from the carrier when the carrier, or the entire bait station, is moved. Also discussed above, step 120 may be performed in a variety of different ways. For example, the pest bait material may initially be provided as a liquid which is then absorbed into, adsorbed or sprayed onto the carrier. The pest bait material may also be provided in solid form, such as in granules, powder, or chunks, mixed with an adhesive solution when is then adsorbed onto one or more surfaces of the carrier. As further examples, the carrier and the pest bait material(s) may also be magnetized or electrically charged to provide a magnetic or electrical bond. In the preferred method, different pest bait materials targeted at different pests may be securely affixed to different surfaces of the carrier. For example, a first pest bait material for exterminating smaller pests may be securely affixed to a bottom surface of the carrier while a second pest bait material for exterminating larger pests is securely affixed to a top surface of the carrier.

In step 130, a housing is provided. In the preferred method, providing a housing comprises forming a base and a removable lid. The base is preferably formed with apertures to enable entry of pests into the housing. The lid preferably shelters the carrier within from downpour by forming a water-tight, yet removable seal with the base. Thus, in step 140, the carrier with the securely affixed pest bait material(s) is disposed in the housing. If, as in the preferred method, the step of providing a housing comprises forming two or more parts configured to be removably coupled to each other, then the method may comprise a further step of assembling the housing by coupling said parts.

In all the embodiments, it should be understood that a disposable system, or kit, is provided along with an associated, preferred method of replenishment. In particular, the carrier 20 preferably comprises a disposable item which can be discarded after a particular duration of usage. A user may simply disassemble the housing and discard an old carrier. A new carrier, carrying a fresh batch of pest bait material(s), may then be disposed in the housing. The lid of the housing is then coupled to the base to complete the assembly. Thus, it is within the scope of the invention to provide a disposable system wherein a single reusable housing is provided, or packaged, with a plurality of disposable carriers.

It will be appreciated that the preferred bait stations may be used in a variety of areas in a building or home where conventional bait stations cannot be employed. The use of a magnet or adhesive patch on the bottom surface of the housing enables the bait station to be coupled to any surface, be it vertical, horizontal or any other orientation. The dislodging of any pest bait material is prevented by securely affixing it to the carrier. Furthermore, the dome shape of the housing also provides an aesthetically pleasing appearance, enabling the bait stations to be placed in open view.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what incorporates the essential idea of the invention.

What is claimed is:

1. A pest control apparatus, comprising:
   a housing including a base and a lid removably coupled to the base, the base including a floor, the housing defining an aperture;
   a bait carrier disposed within the housing and spaced apart from the floor, the bait carrier comprising a cone shape having an upper surface and a lower surface; and
   a pest bait securely affixed to the bait carrier such that any orientation of the bait carrier would not cause the pest bait to become detached from the bait carrier, the pest bait being disposed across a substantial portion of the upper surface of the bait carrier.

2. The apparatus of claim 1, further comprising supports extending from the base and adapted to space the bait carrier apart from the floor.

3. The apparatus of claim 1, wherein the pest bait comprises a first pest bait adhered to the upper surface of the bait carrier.

4. The apparatus of claim 4, further comprising a second pest bait adhered to a lower surface of the bait carrier.

5. The apparatus of claim 1, wherein the lid comprises a dome shape.

6. The apparatus of claim 1, wherein the pest bait is absorbed into the bait carrier.

7. The apparatus of claim 1, wherein the pest bait is adsorbed onto the bait carrier.

8. The apparatus of claim 1, wherein the pest bait is secured to the bait carrier by electrical attraction.

9. The apparatus of claim 1, wherein the pest bait is secured to the bait carrier by magnetic attraction.

10. The apparatus of claim 1, wherein the lid is configured to form a water-tight seal with the base.

11. The apparatus of claim 1, wherein the pest bait comprises granules.

12. The apparatus of claim 1, wherein the pest bait comprises a powder.

13. The apparatus of claim 1, wherein the pest bait comprises pebbles.

14. The apparatus of claim 1, further comprising a magnet coupled to a bottom side of the base.

15. The apparatus of claim 1, further comprising an adhesive coupled to a bottom side of the base.

16. The apparatus of claim 1, wherein the housing is re-usable.

17. The apparatus of claim 16, wherein the bait carrier is disposable.

18. A re-usable pest control kit, comprising:
a reusable housing including a first housing portion and a second housing portion removably coupled to the first housing portion;
a plurality of disposable bait carriers adapted to be placed in the re-usable housing, each disposable bait carrier comprising a cone shape having an upper surface and a lower surface; and
at least one pest bait material securely affixed to each disposable bait carrier such that any orientation of each disposable bait carrier would not cause the securely affixed pest bait material to become detached therefrom, said pest bait material being disposed across a substantial portion of the upper surface of each corresponding disposable bait carrier.

19. The kit of claim 18, wherein the at least one pest bait material comprises a first pest bait material adhered to the upper surface of each corresponding disposable bait carrier.

20. The kit of claim 19, further comprising a second pest bait material adhered to the lower surface of each corresponding disposable bait carrier.

* * * * *